United States Patent [19]
Fleischer et al.

[11] 3,770,962
[45] Nov. 6, 1973

[54] RADIATION DETECTION METHOD

[75] Inventors: Robert L. Fleischer, Schenectady, N.Y.; Robert M. Walker, St. Louis, Mo.

[73] Assignee: General Electric Company, Schenectady, N.Y.

[22] Filed: Nov. 1, 1971

[21] Appl. No.: 194,362

[52] U.S. Cl. .......................................... 250/473
[51] Int. Cl. ............................................. G01t 3/00
[58] Field of Search ............... 250/83.1 PH, 83 CD, 250/83.3 H

[56] References Cited
UNITED STATES PATENTS

| | | | |
|---|---|---|---|
| 3,335,278 | 8/1967 | Price et al. | 250/83.1 |
| 2,819,183 | 1/1958 | Alles | 250/80 |
| 2,963,581 | 12/1960 | Brosky | 250/83 PH |
| 2,934,651 | 4/1960 | Etzel | 250/83 CD |
| 3,662,178 | 5/1972 | Caputi et al. | 250/83 PH |

Primary Examiner—James W. Lawrence
Assistant Examiner—Harold A. Dixon
Attorney—John F. Ahern et al.

[57] ABSTRACT

A process for detecting radiation damage which comprises exposing a surface of a thin sheet of a dielectric material to radiation to form tracks of radiation damaged material therein which pass through the thickness of the sheet. The sheet is then contacted with an etchant which selectively dissolves and removes the tracks of radiation damage material to form holes extending from one surface of the sheet through the opposite surface. The resulting holes are a measure of radiation damage and are detected by visual means by detecting the light which emerges from the holes on the one side of the etched sheet while the opposite side of the etched sheet is irradiated with light having a wavelength which is absorbed by the material in an amout sufficient to produce a significant contrast to the light passing through the holes.

6 Claims, 3 Drawing Figures

PATENTED NOV 6 1973 3,770,962

RADIATION DETECTION METHOD

The present invention relates generally to the art of radiation detection and is more particularly concerned with the detection and measurement of radiation of widely different types and levels of intensity, and with novel radiation measurement methods.

The pioneer radiation-etching method of forming or drilling holes through sheet materials disclosed and claimed in U.S. Pat. No. 3,303,085 which issued Feb. 7, 1967, and assigned to the assignee hereof, results typically in a sheet product in which the holes or apertures are not visible to the naked eye. Consequently, when this method is employed in accordance with the radiation detection and measurement invention disclosed and claimed in U.S. Pat. No. 3,335,278 which issued on Aug. 8, 1967, and also assigned to the assignee hereof, it is not ordinarily possible to read directly and visually the results registered in the form of holes through the test sheet. In either instance, prolonged exposure of the irradiated sheet material to an appropriate etchant, as disclosed in the aforesaid patents, may result in enlargement of the openings through the test sheet until they become visible to the naked eye. This, however, involves delaying the read-out step and in some cases raises the problem of over-etching of the test sheet.

In U.S. Pat. No. 3,415,993 which issued on Dec. 10, 1968 and also assigned to the assignee hereof, a technique for detecting and measuring radiation damage is disclosed wherein one side of a sheet of radiation damage track-forming material is provided with a coating of a metal, the metal being one which dissolves at a rate faster than the radiation damaged material. The opposite surface of the sheet is left uncovered and exposed to a source of radiation to be detected and measured resulting in radiation damage tracks running through the sheet from one side surface to the other. The uncoated side of the sheet is then contacted with an etchant which selectively removes the tracks of damaged material to form holes therethrough and when it reaches the metal coating, it forms holes of considerably greater diameter therein than the holes in the sheet. These larger holes are much more easily seen and provide the means for detecting and measuring radiation damage.

The present invention provides a faster method for detecting radiation than has been heretofore possible. By virtue of the present invention, it is possible to read out with practically no difficulty or delay test results developed through the use of the methods and materials disclosed and claimed in the aforesaid patents. Moreover, this can be done without either significantly complicating or substantially increasing the cost of the basic radiation-etching method of detecting or measuring radiation, and also without reducing the sensitivity of that method or limiting its versatility. A particular advantage of the present method is the ability to detect tracks aligned in a particular direction by the use of a plane parallel (collimated) beam of illumination.

In the present process, etched particle tracks are sensitively displayed by making them appear as light regions on a dark background.

The present invention, together with further objects and advantages thereof, will be better understood from the following description taken in connection with the accompanying drawings, and its scope will be pointed out in the appended claims. In the drawings:

Figure 1:
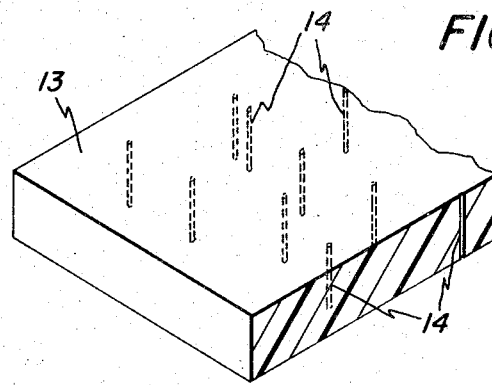
FIG. 1 is an enlarged fragmentary view of a red plastic sheet which has been exposed to radiation and which has tracks of radiation damaged material passing from one surface through the opposite surface.

Briefly stated, the present process for detecting radiation damage comprises exposing a surface of a thin sheet of a dielectric material to radiation to form tracks of radiation damaged material therein which pass through the thickness of the sheet. The sheet is then contacted with an etchant which selectively dissolves and removes the tracks of radiation damage material to form holes extending from one surface of the sheet through the opposite surface. The resulting holes are a measure of radiation damage and are detected by visual means by detecting the light which emerges from the holes on one side of the etched film while the opposite side of the etched film is irradiated with light having a wavelength which is absorbed by the material in an amount which is sufficient to produce a significant contrast to the light passing through the holes.

The material useful in forming the sheets or films of the present process is a radiation damage track-forming material. Such a material must be non-metallic, i.e., a dielectric solid. Preferably, the material is a plastic which can be a thermosetting or thermoplastic polymer or copolymer, particularly an organic polymer. Illustrative of suitable polymers are the polycarbonates disclosed in U.S. Pat. No. 2,946,766. Commercially, these polycarbonates are usually polyesters of bis($\alpha$-hydroxyphenyl) alkanes such as 2,2-bis(4-hydroxyphenyl) propane (Bisphenol A). Additional examples of suitable polymers are polyethylene terephthalate, high density polyethylene, i.e., polyethylene having a density of at least 0.93, polystyrene, and the cellulose esters such as cellulose nitrate, cellulose acetate and cellulose acetate butyrate. A typical example of a satisfactory copolymer is the organopolysiloxane-polycarbonate block copolymer disclosed in U.S. Pat. No. 3,189,662. Other suitable radiation damage track-forming dielectric materials are natural and synthetic glasses.

In the present process, the radiation damage track-forming material is in the form of a sheet or film. Its specific thickness may vary, but it should be at least sufficiently thick that the undamaged, unirradiated portion of the sheet material retains its continuity after the etching procedure is completed. This requires a sheet or film having a minimum thickness of at least 1 micron. The maximum thickness of the sheet is limited by the range of the radiation, i.e., the bombarding charged particles, and the etchability of the material itself as well as its track-defining portions. Where fission fragments are to be detected, the sheet may have a maximum thickness of about 20 microns. For best results with fission fragments, the thickness of the sheet ranges from about 5 to about 18 microns.

The particular material used is largely dependent upon the type of radiation to be detected and measured, i.e., the extent to which the radiation or charged particles form tracks of radiation damaged material through the thickness of the sheet since certain materials are more easily damaged by radiation than others. Polymers such as the cellulose esters, particularly cellulose nitrate, are preferred since tracks of radiation damaged material are most easily formed therein by a wide range of radiation. Specifically, fission fragments and ions heavier than oxygen, such as argon, will form tracks of radiation damaged material in most plastics, i.e., inorganic as well as organic polymers. On the other hand, oxygen ions are effective with polymers such as the polycarbonates as well as the cellulose esters, whereas alpha particles are operable with the more easily damageable polymers such as the cellulose esters.

The etching step to extract, i.e., to dissolve and remove, the tracks of radiation damaged sheet material to form holes through the thickness of the sheet can be carried out in a number of ways. For example, the sheet can be immersed in a solution of the etchant until a sufficient amount of the radiation damaged material in the tracks has been removed to form holes through the thickness of the sheet. Upon completion of the etching step, the etched sheet should be treated to remove the etchant, as for example, by rinsing with water.

The etchant used to dissolve and remove the radiation damaged material will also act to dissolve or attack the unirradiated undamaged portion of the sheet material but such attack is at a rate significantly lower than that on the radiation damaged material, and therefore, it will only be the etching of the tracks of radiation damaged material which will result in holes in the etched sheet.

Generally, the etchant is a liquid. The particular etchant used and its concentration in solution depends on the extractability, i.e., the dissolution and removal of the tracks of radiation damaged material. Typical etchants include hydrofluoric acid, sodium hydroxide, potassium hydroxide, and potassium permanganate.

The holes in the etched sheet are a measure of radiation damage. As used herein the word hole indicates a hole extending in a substantially straight line from one surface of the dielectric sheet through the opposite surface of the sheet. In the present process these holes are detected by visual means by detecting the light which emerges from the holes on one side of the etched sheet, sometimes referred to herein as the front side of the etched sheet, while the opposite side of the etched sheet, sometimes referred to herein as the back side of the etched sheet, is irradiated with light having a wavelength which is sufficiently absorbed by the material to produce a significant contrast to the light passing through the holes.

Figure 2:
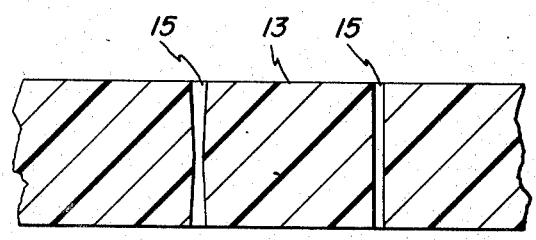
FIG. 2 is a fragmentary enlarged cross-sectional view of a sample of the sheet of FIGURE 1 after it has been etched to selectively dissolve and remove the tracks of radiation damaged material to form holes therein.
Figure 3:
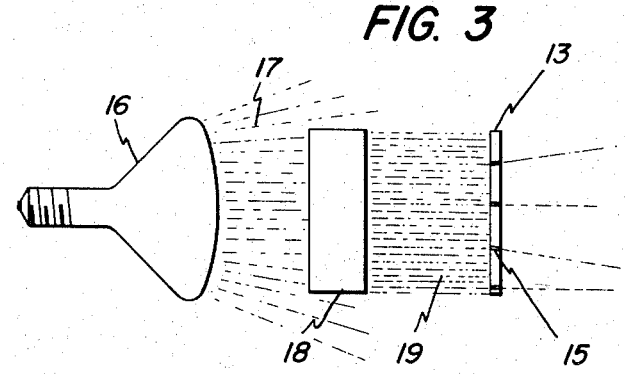
FIG. 3 is a schematic view illustrating a preferred method of detecting and measuring holes in the etched sheet material and thereby determining the radiation dosage to which it has been exposed.

FIG. 1 shows tracks 14 of radiation damaged material in a red colored plastic sheet 13. FIG. 2 shows the sheet 13 after it has been contacted with an etchant which has selectively dissolved and removed the tracks of radiation damaged material to form holes 15 therein. FIG. 3 illustrates one technique of the present process of detecting and measuring holes 15. Specifically, in FIG. 3, a color filter 18 is placed between a lamp 16 which emits white light and the red etched sheet 13. The color filter 18 is selected to transmit only blue light 19 from the white light 17. The blue light 19 irradiated on the back side of the etched sheet 13 is substantially absorbed by the red color of the etched sheet 13 resulting in a significant contrast to the blue light emerging from the front side of the etched sheet from holes 15.

In the preferred embodiment of the present invention, visible light is used and the etched sheet material is a colored material, i.e., it is not water clear. Specifically, it is a colored translucent or transparent material and preferably it is a plastic. The visible light is selected so that it is sufficiently absorbed by the colored sheet material to produce a visually significant contrast ot the light passing through the etched holes therein. Light having a color which is the same as the color of the sheet material cannot be used since it is trasmitted by the sheet material itself and prevents detection of the holes. White light alone cannot be used with a transparent or translucent colored sheet material since it is not sufficiently absorbed by such a material to provide the necessary contract. However, white light can be used with a bandpass color filter of the type used in photography which transmits light substantially only of the desired wavelength. For example, when a filter of a primary color is used, i.e., blue, red or green, only light comprised substantially of that primary color is transmitted. Also, when a yellow filter is used along with a cyan filter, light of a substantially green color is transmitted. Specifically, one or more of the color filters are placed between white light and the colored trasnparent or translucent sheet material to produce light with a wavelength, i.e., color, which is sufficiently absorbed by the sheet material to produce a visually significant contrast to the light passing through the holes therein. In carrying out the preferred embodiment, the color of the sheet material and that of the light irradiated thereon are preferably selected so that the material substantially absorbs the color of the irradiated light and produces as strong a contrast as possible to the light passing through the holes. For example, a blue light applied to one side of an etched sheet of red material would be particularly useful since a blue color is strongly absorbed by a red color, and the blue light emerging from the holes on the opposite side of the sheet would be detectable by the unaided eye resulting in a fast and accurate means of detecting and measuring radiation damage.

To further enhance the hole visibility and accelerate detection of radiation damage in the preferred embodiment, the side of the etched sheet from which the visible light emerges, i.e., the front side, can be covered with a photographic plate or luminescent screen. As the light passing through the etched sheet impinges on the photographic plate or luminescent screen, it is more highly visible, i.e., it results in a higher resolution. Also, the image of the holes on the plate or screen can increase with intensity of the irradiated light or time due to halo effects in the etched sheet itself if it is made of plastic or in the luminescent screen.

In the preferred embodiment, sources other than white light, can be used to provide a visible light of the desired color. For example, yellow light can be provided by a sodium arc lamp. Visible light ranges in color from violet to blue to green to yellow to orange to red.

In another embodiment of the present invention, the etched sheet material is not colored, i.e., it is a water clear dielectric solid, and preferably a water clear plastic. In this embodiment, a light which is not visible to the naked eye is used which has a wavelength to which the etched water clear plastic sheet material is opaque, i.e., one which is significantly absorbed by the water clear sheet material. In such instance, for example, ultraviolet light or infrared light can be used to irradiate the back side of the etched water clear plastic sheet. An image converting device, such as a phosphor or photographic plate, is then provided on the front side of the sheet to detect the light passing through the holes and provide the necessary means for final visual observation.

As one application of the present process, the dielectric sheet can be supported in a personnel badge or otherwise suitably supported in a radiation environment as disclosed and claimed in aforesaid U.S. Pat. No. 3,335,278, the entire disclosure of which is incorporated herein by reference, and the present process used to detect the radiation damage therein.

If desired, to further simplify the present radiation detection process, a photographic print is made of the light passing through the holes of the etched material or of the images of such light. The radiation detection and measurements are then made from the photographic print.

The invention may be illustrated by the following examples.

EXAMPLE 1

A translucent ruby-red sheet of cellulose nitrate having a thickness of about 18 microns may be exposed to a source of Californium-252 fission fragments for one-quarter hour in a substantial vacuum to produce tracks of radiation damage therein.

The sheet may then be immersed in an etchant for 6 minutes, rinsed with water and dried in air. The etchant may be a 6.25N sodium hydroxide solution which is maintained at a temperature of 50° C during the etching step.

The etched sheet may then be placed about 18 inches away from a 300 watt lamp which furnishes white light. A bandpass color filter which is transparent to blue light may be placed about midway between the lamp and the etched sheet. When the lamp is turned on, substantially only blue light is irradiated over the entire surface of one side, i.e., the back side, of the etched sheet. The etched red sheet then darkens to a black color and produces a visually significant contrast to the blue light passing through the holes of the sheet thereby allowing visual location of the holes on the opposite side, i.e., the front side of the sheet, by the unaided eye.

When the lamp is shut off, these holes are not visible to the unaided eye since they have a diameter less than about 5 microns.

The etched sheet may also be used as a negative to produce a black and white print. Specifically, a conventional photographic paper may be placed over the front side of the etched sheet, the lamp may then be turned on again and the photographic paper is exposed to the blue light which passes through the holes in the sheet. The photographic paper may then be developed in a conventional manner to produce a black and white print showing the holes.

EXAMPLE 2

A transparent blue sheet of cellulose nitrate having a thickness of 18 microns is used and the procedure of Example 1 is followed except that a bandpass color filter which is transparent to red light is used. Substantially only red light is irradiated on one side of the blue etched sheet. The blue sheet then darkens to a black color and produces a visually significant contrast to the red light passing through the holes thereby allowing visual location of the holes on the opposite side of the sheet by the unaided eye.

When the lamp is shut off, these holes are not visible to the unaided eye since they have a diameter less than about 5 microns.

In copending U.S. Pat. application Ser. No. 194,428 entitled "Radiation Detection Method" filed of even date herewith in the name of Robert L. Fleischer, and assigned to the assignee hereof there is disclosed a process for detecting and measuring radiation damage which comprises providing a sheet of a dielectric polarizing material having a thickness of at least about 1 micron, exposing said sheet to radiation to produce tracks of radiation damaged material therein extending from one surface through the opposite surface of said sheet, contacting said sheet with an etchant to selectively dissolve and remove said tracks of damaged material to form holes therein passing from one surface through the opposite surface of said sheet, irradiating visible light polarized in a single plane on one side of said etched sheet, and positioning said sheet with said light irradiated on one side thereof until said etched sheet becomes sufficiently darkened to produce a visually significant contrast to the light passing through said holes, and detecting the light passing through said holes on the opposite side of said sheet. This patent application is, by reference, made part of the disclosure of the present application.

What we claim as new and desire to secure by Letters Patent of the United States is:

1. A process for detecting and measuring radiation damage which comprises providing a sheet of a dielectric material having a thickness ranging from about 1 micron to 20 microns, said material being characterized as a colored material translucent or transparent to white light and having the property of absorbing visible light of a color except white sufficiently when irradiated with said absorbable light to substantially block transmission thereof and to appear opaque therein, exposing said sheet to radiation to produce tracks of radiation damaged material therein extending from one surface through the opposite surface of said sheet, contacting said sheet with an etchant to selectively dissolve and remove said tracks of damaged material to form holes therein passing from one surface through the opposite surface of said sheet, said holes not being visible to the unaided eye, irradiating said absorbable colored light on one side of said sheet making said sheet appear opaque therein, said sheet allowing transmission of said colored light only through said holes therein and said colored light emerging from said holes on the opposite side of said sheet being detectable by the unaided eye.

2. A process according to claim 1 wherein said material is a plastic.

3. A process according to claim 2 wherein said plastic is a cellulose ester selected from the group consisting of cellulose nitrate, cellulose acetate and cellulose acetate butyrate.

4. A process for detecting and measuring radiation damage which comprises providing a sheet of a dielectric material having a thickness ranging from about 1 micron to 20 microns, said material being characterized as water-clear and having the property of blocking transmission of infrared or ultraviolet light, exposing said sheet to radiation to produce tracks of radiation damaged material therein extending from one surface through the opposite surface of said sheet, contacting said sheet with an etchant to selectively dissolve and remove said tracks of damaged material to form holes therein passing from one surface through the opposite surface of said sheet, said holes not being visible to the unaided eye, irradiating light selected from the group consisting of infrared light and ultraviolet light on one side of said sheet, said sheet allowing transmission of said light only through said holes therein and providing means in association with the opposite side of said sheet to make said infrared or ultraviolet light emerging from said holes visible.

5. A process according to claim 4 wherein said water-clear material is a plastic.

6. A process according to claim 5 wherein said plastic is a cellulose ester selected from the group consisting of cellulose nitrate, cellulose acetate and cellulose acetate butyrate.

* * * * *